US012720273B2

(12) United States Patent
Doms et al.

(10) Patent No.: US 12,720,273 B2
(45) Date of Patent: Aug. 25, 2026

(54) AUDIO SIGNAL PROCESSING METHOD

(71) Applicant: Areal BV, Wuustwezel (BE)

(72) Inventors: Pieter Doms, Wuustwezel (BE); Arno Voortman, Overmere (BE)

(73) Assignee: Areal BV, Boom (BE)

( * ) Notice: Subject to any disclaimer, the term of this patent is extended or adjusted under 35 U.S.C. 154(b) by 106 days.

(21) Appl. No.: 18/291,655

(22) PCT Filed: Jul. 29, 2022

(86) PCT No.: PCT/EP2022/071342
§ 371 (c)(1),
(2) Date: Jan. 24, 2024

(87) PCT Pub. No.: WO2023/006945
PCT Pub. Date: Feb. 2, 2023

(65) Prior Publication Data
US 2025/0088820 A1 Mar. 13, 2025

(30) Foreign Application Priority Data
Jul. 30, 2021 (BE) .................................. 2021/5604

(51) Int. Cl.
*H04S 7/00* (2006.01)
*G10L 19/008* (2013.01)
(Continued)

(52) U.S. Cl.
CPC .............. *H04S 7/307* (2013.01); *H04S 3/008* (2013.01); *H04S 3/02* (2013.01); *H04S 5/005* (2013.01);
(Continued)

(58) Field of Classification Search
CPC . H04S 7/00; H04S 7/307; H04S 3/008; H04S 3/00; H04S 3/02; H04S 3/04; H04S 3/004; H04S 3/002; H04S 5/005; H04S 5/00; H04S 1/002; H04S 1/00; H04S 2400/01; H04S 2400/05; H04S 2400/11; H04S 2400/13; H04S 2420/07; H04R 3/04; H04R 3/14; H04R 5/02; H04R 5/04; H04R 5/00; H04R 5/005; H04R 1/403; G10L 19/008
(Continued)

(56) References Cited

U.S. PATENT DOCUMENTS 4,841,572 A * 6/1989 Klayman ................ H04S 1/002 381/1
5,850,453 A * 12/1998 Klayman ................ H04S 1/002 381/1
(Continued)

OTHER PUBLICATIONS

Choi, S. et al., "Blind Upmixing for Height and Wide Channels Based on Image Source Method," AES Convention 133: Oct. 1, 2012, AES, 60 East 42nd Street, Room 2520, New York, NY 10165, Oct. 25, 2022; 7 pages.
(Continued)

*Primary Examiner* — Leshui Zhang
(74) *Attorney, Agent, or Firm* — Hamilton, Brook, Smith & Reynolds, P.C.

(57) ABSTRACT

The invention relates to a computer-implemented audio signal processing method for upmixing an input audio stereo signal (S) into a set of multi-channel output signals (O).

15 Claims, 2 Drawing Sheets

(51) Int. Cl.

| | |
|---|---|
| ***H04S 3/00*** | (2006.01) |
| ***H04S 3/02*** | (2006.01) |
| ***H04S 5/00*** | (2006.01) |

(52) U.S. Cl.
CPC ....... *H04S 2400/01* (2013.01); *H04S 2400/05* (2013.01); *H04S 2400/11* (2013.01); *H04S 2400/13* (2013.01); *H04S 2420/07* (2013.01)

(58) Field of Classification Search
USPC ..... 381/1–21, 303, 306, 307, 309, 310, 311, 381/61, 77, 80, 82, 119; 700/94
See application file for complete search history.

(56) References Cited

U.S. PATENT DOCUMENTS

| | | | | |
|---|---|---|---|---|
| 5,970,153 | A * | 10/1999 | Petroff | H04R 5/04 381/28 |
| 9,820,073 | B1 | 11/2017 | Foti | |
| 2010/0286990 | A1* | 11/2010 | Biswas | G10L 19/008 704/502 |
| 2010/0296672 | A1 | 11/2010 | Vickers | |
| 2015/0350802 | A1* | 12/2015 | Jo | H04S 5/005 381/1 |
| 2015/0350804 | A1* | 12/2015 | Crockett | H04S 7/30 381/307 |
| 2016/0134989 | A1* | 5/2016 | Herre | H04S 7/308 381/20 |
| 2016/0142853 | A1* | 5/2016 | Herre | H04S 7/302 381/23 |
| 2017/0034639 | A1* | 2/2017 | Chon | H04S 3/008 |
| 2017/0188169 | A1* | 6/2017 | Chon | H04S 7/30 |
| 2017/0325043 | A1* | 11/2017 | Jot | H04S 3/002 |
| 2018/0184227 | A1* | 6/2018 | Chon | H04S 3/008 |
| 2020/0058311 | A1* | 2/2020 | Goodwin | G10L 19/008 |
| 2020/0213800 | A1 | 7/2020 | Jot | |
| 2020/0228908 | A1 | 7/2020 | Chon et al. | |
| 2024/0373184 | A1* | 11/2024 | Brown | H04S 3/008 |

OTHER PUBLICATIONS

Notification of Transmittal of International Search Report and Written Opinion for International Application No. PCT/EP2022/071342, mailed Nov. 8, 2022.
Search Report and Written Opinion for Belgian Priority Application No. BE2021/5604, mailed Apr. 19, 2022.
Kraft, S. and Zölzer, U., "Stereo Signal Separation and Upmixing by Mid-Side Decomposition in the Frequency-Domain," Proc. of the 18th Int. Conference on Digital Audio Effects (DAFx-15), Trondheim, Norway, Nov. 30-Dec. 3, 2015, 6 pages.

* cited by examiner

AUDIO SIGNAL PROCESSING METHOD

This application is the U.S. National Stage of International Application No. PCT/EP2022/071342, filed on Jul. 29, 2022, which designates the U.S., published in English, and claims priority under 35 U.S.C. § 119 or 365(c) to Belgian Application No. BE2021/5604, filed on Jul. 30, 2021. The entire teachings of the above applications are incorporated herein by reference.

FIELD OF THE INVENTION

The invention relates to a computer-implemented audio signal processing method for upmixing an input audio stereo signal (S) into a set of multi-channel output signals (O).

BACKGROUND

In many applications, it is desirable to generate a three-dimensional soundscape capable of simulating reality embedding multiple directional sound sources to enhance the perception of the user. However, most methods in the prior art only rely on regular stereo feed to attempt the creation of an articulated multi-dimensional soundscape. These attempts tend to result in compromised sound quality and degraded user experience due to the inherent presence of artefacts scattered through the soundscape. Since the arrival of stereo, music and media productions tend to allocate side information within the feed to foster enhanced spatial properties of a song/recording. However, most methods in the prior art rely on regular stereo feed to create an articulated soundscape. Existing upmixing methods typically compromise the quality of user experience. To this extent, the user would experience a substantial spatial directional difference deriving from the excessive information contained in the height layer, leading to a degraded user experience.

Most methods presented in the prior art rely on processing filters which do not provide a linear phase response in the frequency domain, leading to directional sound artefacts in the soundscape, ultimately degrading the user experience and compromising the multi-dimensionality of the feed. To this extent, the non-linear phase response leads to a soundscape sounding over-processed to the final user. Additionally, most of the methods presented in the prior art rely on processing filters operating in a broad frequency range spanning outside the human audible frequency support. This leads to part of the frequency spectrum becoming unequal in terms of amplitude at a given direction, resulting in a degraded user experience due to the sound being perceived as non-uniformly distributed in space.

Most of methods presented in the prior art rely on a the relation between the Left and Right stereo channel to provide a representation of the Centre channel, however this results in a divided perception of the user towards Left and Right side. More in particular, with this approach, important sound items may not be accurately positioned within the soundscape, neither retain the tonal character resulting in an over-processed feeling to the user. Ultimately, important sound objects like vocals result in an inferior user experience.

Existing upmixing methods typically use reverb to create a feel of space. This is achieved adding artificial information to the original signal which in returns translates into the original sound losing its definition and unnaturally altering the sound spatial presence, hindering the user experience. Additionally, reverb can only be used in limit-sized spaces, and is not suitable for large live settings.

Therefore, there is a need for methods to render an input audio stereo signal into a plurality of spatially distributed pseudo surround channels to enhance the user experience.

SUMMARY OF THE INVENTION

The inventors have surprisingly found that one or more of these problems can be solved by the present invention and embodiments thereof. The present method allows for a detailed preset comprising new insights and features that concur with the high surround sound standards required. The present invention respects the creative process of sound design. The present invention does not need reverb to create a feel of space, thereby maintaining the original character of the music. No effects need to be added to the music, it is merely spatially (and equally) distributed.

The present invention provides a computer-implemented audio signal processing method for upmixing an input audio stereo signal (S) in a plurality of spatially distributed pseudo surround channels to define a height layer. Said method preferably comprises the steps of:

- receiving at least one input audio stereo signal (S);
- performing a pre-processing stage on the input audio stereo signal (S), said pre-processing stage comprising the steps of:
  - performing Mid-Side decoding to generate at least one Sum (SUM) signal and at least one Difference (DIFF) signal;
  - performing polarity reversal on the at least one Difference (DIFF) signal;
  - performing filtering by means of at least 2, preferably at least 4, filtering banks (PF) on the at least one Difference (DIFF) signal;
- reconstructing at least 2, preferably at least 4, signals from the filtering banks (PF), thereby obtaining upmixed output signals (O);
- performing high-pass filtering on at least one upmixed output signal (O); preferably on all upmixed output signals (O);
- performing level adjustment on at least one upmixed output signal (O); preferably on all upmixed output signals (O); and,
- routing the upmixed reconstructed audio signals (O) to audio speaker channels (C) to feed Top Channels, for example at least a Top Front Left channel (TFL), Top Front Right channel (TFR), Top Rear Left channel (TRL) and Top Rear Right channel (TRR), thereby defining a matrix of spatially distributed channels forming the height layer.

In some embodiments, the filtering banks (PF) are configured to have linear phase response in the frequency domain.

In some embodiments, the filtering banks (PF) are configured to operate around filter sub-bands (PSB), each of these sub-bands (PSB) having central frequency FSB-C, and configured to operate around a range of low-frequency sound waves above a lower cut-off frequency FSB-L and a range of high frequency sound waves lower than an upper cut-off frequency FSB-U.

In some embodiments, each of the filter sub-bands (PSB) is configured to have amplitude around the sub-band centre frequency FSB-C chosen in the range spanning from −3 dB to −15 dB, preferably from −6 dB to −12 dB, and more preferably −9 dB.

In some embodiments, the filtering banks (PF) are configured to have a width between ⅙th of an octave and an octave.

In some embodiments, the operating frequency range of the filter sub-bands (PSB) is configured to operate within a frequency range spanning from $F_L$ and $F_U$, wherein $F_L$ to $F_U$ is from 350 Hz to 20 kHz, preferably from 400 Hz to 10 kHz, and more preferably from 500 Hz to 9 kHz.

In some embodiments, amplitude compensation is performed outside the frequency support of the filtering banks (PF), wherein said amplitude compensation is performed in relation to the amplitude level at $F_L$ and $F_U$, and wherein said amplitude compensation entails a resulting amplitude level around $F_L$ and $F_U$, which are chosen within the range spanning from −3 dB to −12 dB, preferably from −6 dB to −9 dB, more preferably −6 dB.

In some embodiments, high-pass filtering (HPF) is performed on each of the height channels using high-pass filters (HPF), wherein such high-pass filters (HPF) are configured to operate having central frequency FHFC=500 Hz.

In some embodiments, the high-pass filters are high shelf filters and have linear phase response in the frequency domain.

In some embodiments, level adjustment is performed on each of the upmixed output audio signals.

In some embodiments, the processing time is in the order of milliseconds, preferably shorter than 5 ms, more preferably shorter than 3 ms, and more preferably shorter than 1 ms.

In some embodiments synchronisation is performed at the Mid-Side decoding step, and latency compensation is performed to the input channels not subjected to Mid-Side decoding steps.

In some embodiments the method further comprises the steps of:

performing delay adjustment (D-ADJ) on at least one (SUM) signal;

routing the upmixed reconstructed audio signals (O) to audio speaker channels (C) to feed at least a Center channel (CE) and a Low Frequency Effect (LFE) channel thereby defining a matrix of spatially distributed channels forming the centre layer; and, performing low-pass filtering (LPF) on the LFE channel.

In some embodiments, said method is further configured to perform compensation filtering on the obtained upmixed output signals (O).

In some embodiments, the compensation filters are low and/or high shelf filters and have linear phase response in the frequency domain.

DETAILED DESCRIPTION OF THE INVENTION

Figure 1:
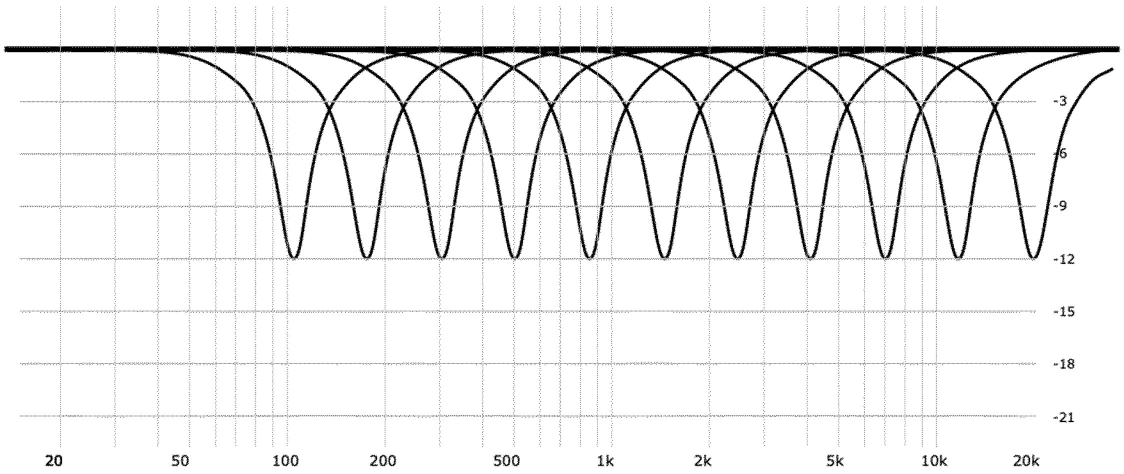
FIG. 1 illustrates a graph showing filtering banks according to one preferred embodiment of the invention.
Figure 1:
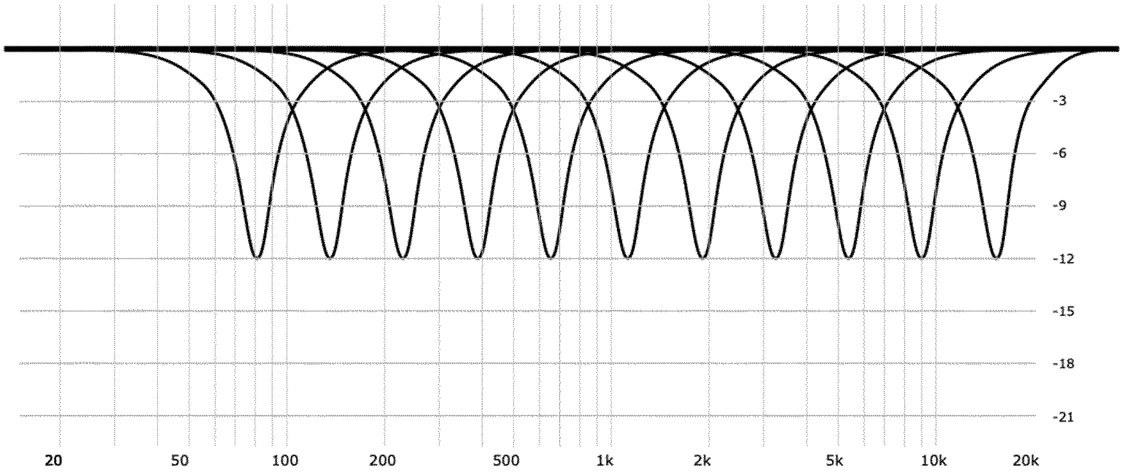

The present invention will be described with respect to particular embodiments, but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints. All documents cited in the present specification are hereby incorporated by reference in their entirety. Unless otherwise defined, all terms used in disclosing the invention, including technical and scientific terms have the meaning as commonly understood by one of the ordinary skill in the art to which this invention belongs.

By means of further guidance, definitions for the terms used in the description are included to better appreciate the teaching of the present invention. The terms or definitions used herein are provided solely to aid in the understanding of the invention. Reference throughout this specification to "one embodiment" or "an embodiment" means that a particular feature, structure or characteristic described in connection with the embodiment is included in at least one embodiment of the present invention.

Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and description, any of the claimed or described embodiments can be used in any combination.

When focusing on the height layer, there are several important steps that are performed. When modifying one or more of these steps, the user may experience a major difference in the result.

For the creation of the height layer, the present invention uses a technology that is known as MS encoding. By MS encoding the stereo signal, there is no longer a left and right signal but a sum, known as mono, and a difference (sides). In music production, the width or spatial properties of a song are defined by the amount of the side information. For example, an artificial stereo reverb creates a lot of side information to create the feel of space. So, one could say that a track that has a lot of side information is created to feel spatial and therefore comes into its own in a 3D upmix. The information of the MS encoder in the difference channel is therefore of perfect use in the height layer.

In the present invention, a MS matrix is used to generate a difference signal from the left right stereo signal. This difference signal is used to create a height layer to accomplish a true 3D upmix. If a MS matrix would be skipped, and a regular stereo feed would be used instead to create the height layer, there would be too much stereo centre information in the height speakers. Typically, the most important items in music are present in the center of the stereo feed. By not including this information in the height layer, the present invention allows these items to maintain the correct focus.

The MS matrix may be applied to the original stereo signal in order to create a mono (summed) of the original left and right signal and a difference (sides) signal. The mono sum may be created by simply adding the right and left signal together. The difference signal may be created by subtracting the right signal from the left signal. The subtraction is preferably done by reversing the phase of the right signal, creating a negative right signal, and adding that to the left signal. As a result, one obtains a difference signal which contains the signals that are not identical in the left and right signal. These signals typically contain the "spatial" information of a stereo track. Sounds such as reverb information or extreme panoramic sounds are present in the difference signal.

With sound designs, the most important features of a music track are placed in the centre of the stereo image. This centre is known as the "mono" when the stereo feed is processed by the MS matrix. The difference contains all the information except for the stereo centre. Therefore, if one would use the stereo to create a height layer, important sounds such as a lead vocal would be divided in not just 2D but in 3D. The user would then experience a too large spread from the important features in a song. It would then be harder to focus on a specific sound.

In the present invention, the combination of the 2D division and the mono feed of the centre channel is not disturbing in the lower layer of the 3D upmixed signal. By using the difference signal for the height speakers, there is no further degradation of the important sounds.

In addition, in music production, when a song is created to sound big, there will be a lot of information in the difference signal. When a song is created to sound small, there will only be a few details in the difference signal. This results in the fact that the height layer will be an extension of the creative process that has been designed for each song. Big, large pieces of music will have more height feeling than a small intimate songs, exactly the way the piece was intended to sound.

The difference (sides) signal, is the signal used to generate the height layer. There is preferably one main difference between the processing from the left to Left A and Left B and the processing used to generate Height A and Height B. In the processing used to generate Height A and Height B, a compensation filter is preferably only used for the region above the processing range (for example 9 kHz and above). The region below the processing range is preferably removed from the height speakers by introducing a high pass filter at the bottom border frequency of the processing range. Since most spatial sound contains no lower frequencies, there is no need to generate lower frequencies in the height speakers.

The level of the height speakers is preferably attenuated to match the front and rear speakers. If the level is too high, the focus to the height speakers will be too big and the result would be disturbing. Therefore, the height speakers are preferably attenuated, for example by 5 dB. The exact amount may depend on the speakers used in the surround set up.

To avoid too much interaction between front speakers and front height speakers, the height B signals are preferably routed to the front height speakers which may combine perfectly with the Left A and Right A signals generated by the front speakers.

Since the difference signals are signals that are also present in the original stereo signal, undesired interaction between the height and front speakers might appear. To avoid this, B processing is preferably applied to the height speakers and A processing to the front speakers. The same process is applied to the rear speakers and the rear height speakers. Only the rear speakers have Left B and Right B signals, therefore the Height A signals are introduced to the height rear channels.

In such a situation, the rear height speakers generate a partially identical signal diagonally towards the front speakers. Since these speakers typically face each other, there might be an unpleasant interaction between them in the centre of the setup. To solve this problem, it is preferred to polarity reverse all the signals routed to the height speakers. When these signals are combined with the front speaker signals, they will add up instead of subtract. Since the lower layer front speakers and the upper layer rear speakers generate (a small bit) of identical signals and they are facing each other, it is particularly preferred to perform polarity reversal on the height channels. This results in no degradation of the sound quality.

Therefore, in some embodiments, the signals that are used in the height layer are polarity reversed towards the lower layer. For the 3D upmix, the processing filters that are used in the frontal speakers in the lower level are preferably identical to those in the height rear speakers. In the signal coming from the difference channel of the MS matrix, there is a small bit of the stereo signal. Therefore the rear height speakers and the front lower layer speakers generate signals that are identical to each other. Since they face each other, the signals may subtract in the centre of the surround set up. The user will notice a large difference in sound and sound quality, depending on whether the user listens while sitting down or standing up.

However, by polarity reversing the height layer, the signals meeting in the centre of the surround will add up and the user will experience a more stable sound experience along the Z-axis.

The Present invention preferably uses the same series of filters designed to create LA, LB, RA, and RB as it would for the height speakers, with the difference that for the height channels the low shelf filter (for example starting at 502 Hz) is preferably changed into a high pass filter (for example at 502 Hz), since there is no need for low frequencies in the height channel. The series of filters used in the height channels (either A or B processing) is preferably opposite to the series used in the lower layer. For example, the height front left and right channels will generate the side information processed by the B series of filters. Therefore, the lower and upper layer will cooperate perfectly. The same applies for the height rear left and right channels, which will generate the side information processed by the A series of filters.

The height layer in the 3D upmix is an addition to the lower layer which creates a more into the music feel than a 2D upmix and definitely a stereo mix. However, it is preferred that the height layer remains an addition and does not become a primary sound source. Therefore, the signal going to the height layer is preferably attenuated. Without attenuation of the signal, the user might experience a disturbance of the lower layer signals, which contain all the primary sounds in a normal music production. This would sound unpleasant and would not satisfy the expectations. However, when the height layer is attenuated according to preferred embodiments (for example in a range from −3 dB to −12 dB), the primary sound sources will remain focused in the lower layer and the height layer will feel more like a natural addition to the experience.

In some embodiments, the filtering banks (PF) are configured to have linear phase response in the frequency domain. Lack of linear phase leads to overprocessed sound and sound artifacts, degrading the spatial perception of the final user. The use of linear phase filters is required to reach the level of quality desired in the present invention. The use of linear phase filters will prevent the phase shifting that occurs with traditional filters. Due to the unchanged phase response of the signals the interaction will be natural instead of sounding over-processed.

The basic principle of the present invention comprises splitting one signal into two signals by dividing the frequencies. The left signal is divided into Left A and Left B. The dividing from left to Left A and Left B is done by a series of frequency filters, more specifically the present invention employs linear phase filters to remove the phase shifting between speakers caused by traditional filters. The filters used have 3 specific properties: amplitude, frequency and width. Each of these properties is related to the other. The right channel is divided into Right A and Right B in the identical way the left signal is divided into Left A and Left B. The Left A signal is routed to the front left speaker, the Right A signal is routed to the front right speaker, the Left B signal is routed to the left rear speaker and the Right B signal is routed to the right rear speaker.

In a preferred example, as referred to FIG. 1, a magnitude of −9 db is used, a width of ⅓rd octave is used, and the following example frequencies are used: 502 Hz, 652.6 Hz, 848.8 Hz, 1102.9 Hz, 1433.7 Hz, 1863.8 Hz, 2423 Hz, 3149, 9H, 4094.9 Hz, 5323.3 Hz, 6920.3 Hz, 8999.4 Hz. As exemplified herein, the spacing of the frequencies is preferably ⅓rd octave. This directly relates to the filter width used. If the filter width becomes more narrow, the spacing of the frequencies must be adjusted to match the filter width used. However, filters being too small or too wide are preferably avoided. According to some preferred embodiments, each of the filtering banks (PF) is configured to have a width between $\frac{1}{6}^{th}$ of an octave and an octave.

In some embodiments the filtering banks (PF) are configured to operate around filter sub-bands (PSB), which configured to operate within an operating frequency range spanning from $F_L$ and $F_U$, wherein $F_L$ to $F_U$ is preferably from 350 Hz to 20 kHz, preferably from 400 Hz to 10 kHz, and more preferably from 500 Hz to 9 kHz. Furthermore, said filtering sub-bands may be configured to extract at least 4 (PSB) sub-bands signals, preferably 8 (PSB) sub-bands signals, more preferably 16 (PSB) per filtering bank. The inventors have surprisingly found that extracting a sufficient number of sub-band signals used to reconstruct the audio feed, results in an output feed expressing enhanced dynamic range and improved spatial resolution.

The average person is unable to locate the area below 500 Hz and above 9 kHz in a space. Therefore, the processing used to divide the frequencies between Left A and Left B, is preferably only active in this region. When the filtering would rise above 9 kHz the open sound associated with these frequencies would become unequally divided over the listening area resulting in an unsatisfying coverage of the "open sound". If the filtering would drop below 500 Hz the summation of the low frequencies would be next to nothing, resulting in a poor sound across from the upmixed signal that has a warm feel because of this low frequency summation.

In some preferred embodiments, amplitude compensation is performed outside the operating band of the sub-band filtering, wherein such compensation preferably has an amplitude of from −9 dB to −3 dB, more preferably about −6 dB. In some preferred embodiments, compensation filters are low and high shelf filters. In the case of the height layer, low shelf filters may become high pass filters.

Since there may be an overlap of the filters, there may be a general amplitude reduction in the processing frequency range. Therefore, compensation filters are preferably introduced above and below the processing range. These filters are preferably low and high shelf filters, preferably also linear phase type. When using −9 dB magnitude with a ⅓rd width and ⅓rd spacing, a compensation filter of −6 dB is preferred.

The frequency of the compensation filter is the border frequency of the processing range. As seen in the list above, exemplified border frequencies are 502 Hz and 8999.4 Hz. Since the compensation filters are set to this frequency, they will reduce the magnitude by 3 dB at that frequency. Therefore the magnitude of the border frequency filters used in the processing is preferably set to −6 dB so that the result of the sum of both will be −9 dB.

In some embodiments, a (small) delay is introduced to the centre signal. When the speaker set up is performed properly according to the ITU-R BS.775 standard, there is no need for a delay to the centre signal. However, in most practical set ups, the front left, front right, and centre speaker are physically placed on the same line. In this case, a small delay (for example ranging from 1 ms to 5 ms) could prevent the focus going to the centre channel instead of all speakers equally.

In some embodiments, a Low Frequency Effect channel (LFE) may also receive the mono sum from the MS matrix. The same principles of the centre channel can be applied to the LFE. In addition to level and delay, a low pass filter may also be introduced. This prevents the LFE from generating frequencies too high for application. The frequency of this filter depends on the frequency response of the speakers, for example used in a 5.1.4 set up. The frequency can vary from 60 Hz to 200 Hz. The level use for the LFE signal is preferably −9 dB, but this may also vary depending on the surround setup.

In some preferred embodiments, the present invention uses dynamic EQ filters. These filters have a fixed frequency and bandwidth, similar to the frequencies and bandwidth described in the previous section. A dynamic filter has the possibility to interact with the signal that is fed to it in the magnitude domain. The filters are preferably set up to decrease the magnitude as the input signal rises. In a preferred embodiment, 2 layers of series of filters are used. The first layer preferably contains the static filters with the frequencies and bandwidth described as herein, for example with a magnitude set to −6 dB instead of −9 dB. The second layer preferably contains a series of dynamic filters, for example with a maximum magnitude range of −6 dB.

The benefit of this technique is that the method will isolate specific sounds that are popping out of the song and place it in space. When the sound disappears and the level drops below the dynamic filters threshold the method will return to its static position. This results in an organic upmix that interacts with the music and generates a more creative upmix technology.

A variant to this technique could be achieved with the use of multiband compression. The multiband compressor should be introduced on the second layer of the dynamic upmix and should replace the dynamic filters. With the use of a multiband compressor, one can compress (attenuate) or expand (increase) a specific frequency region. Mostly multiband compressors have a wider frequency region to operate in than dynamic filters. The dynamic upmix of the present invention can use a multiband compressor to, for example, attenuate a frequency region on the rear speakers and increase the same region in the front speaker. This results in a dynamic interaction between the processing and the music. When a sound pops out of the music, it will be projected to the front; when that sound stops, the upmix returns to its static position.

The present method may also be used in a live setting. The method even has the possibility to live interact with the music to contribute on a creative level, whereby the basic principles remain the same (for example linear phase, filtering from 500 Hz to 9 khz). In some embodiments, a frequency range is isolated from the algorithm, and the method comprises a mono sum of the isolated range without processing applied. This results in a specific frequency range of a song (e.g. 800 Hz-3 kHz) that is isolated from the static upmix and can be moved around in the soundfield, which from now on may be described as an "object". The moving around can be performed by a Vector/Intensity/Layer Based Amplitude Panning type. However it is preferred to not use a pan delay based system, since this would create a time difference between the object and the upmix. The present method can enable or disable the creation of the object. The present method can adjust the width of the frequency range of the object. The present method can move the object through the sound field. The use of the present method surpasses the previous known stereo experience and adds another creative layer to the upmix algorithm.

In some embodiments, the present method is used on a digital sound processor unit (DSP) or in alternative on a field-programmable gate array (FPGA).

In some embodiments, the present method uses delay compensation on the audio channels not subject to Mid/Side encoding. In the present invention Non Mid-Side encoded audio channels are subject to adjustments signal paths that results in delay which occurs as a consequence of the processing/adjusting signal path. The present method introduces delay compensation on the non Mid/Side encoded signal paths to establish time synchronisation with the Mid/Side encoded signal paths. The compensation delay is chosen within the range 0.1 ms to 2.0 ms.

EXAMPLES

With the current method and embodiments thereof, it is also possible to create a height layer from a 2D surround format. For example, it is possible to create a 5.1.4 mix from a 5.1 mix.

Figure 2:
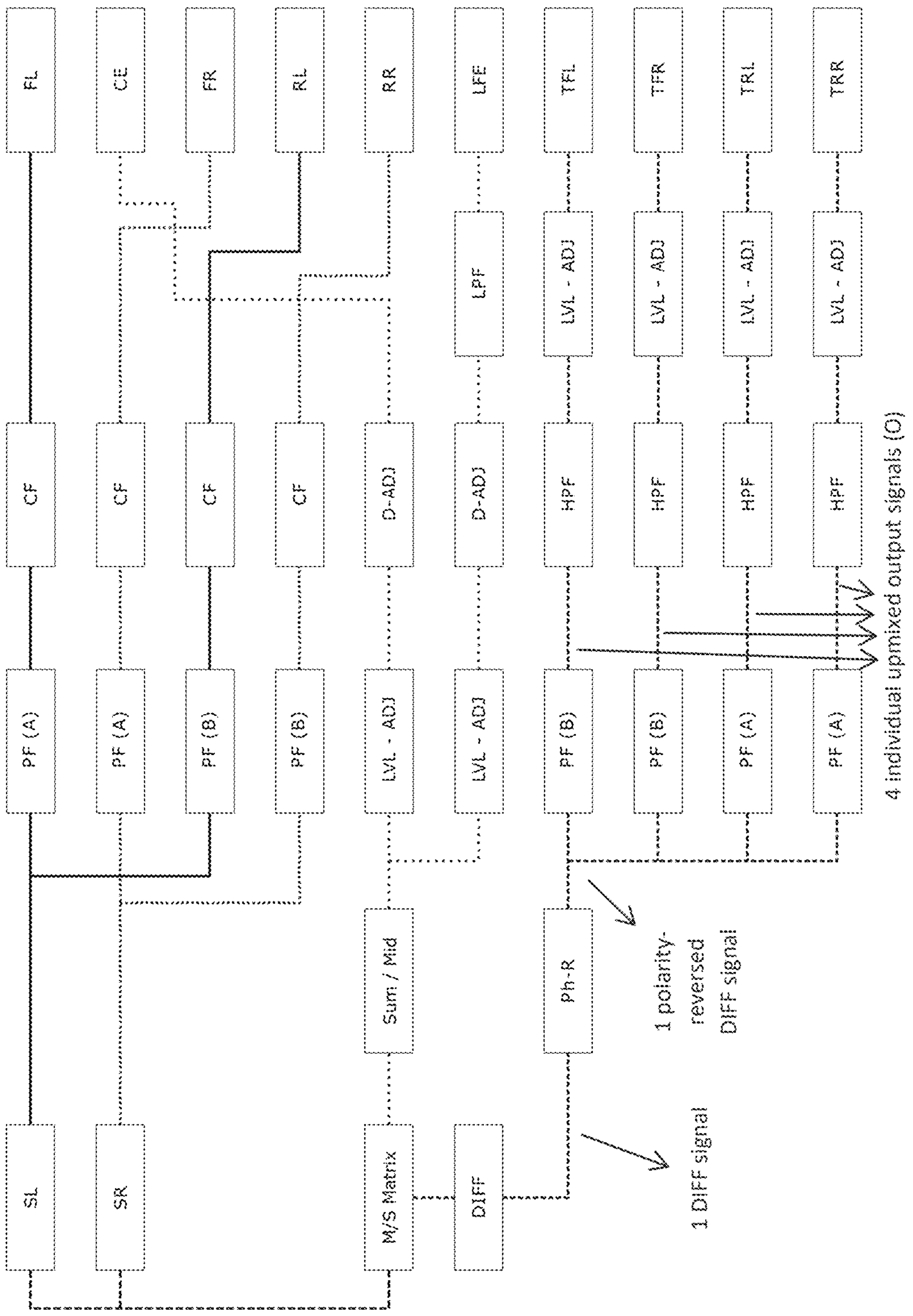
FIG. 2 illustrates a block scheme according to one preferred embodiment of the invention.

As referred to FIG. 2, the height layer is achieved by the use of a MS matrix. For example, the front height speakers receive a signal that is generated by the MS matrix which is placed on the front left and front right signal of the 5.1 mix. The difference signal is used for the heights. A and B filter processing is applied on the difference signal to create Front Height A and Front Height B. The Front Height A signal is fed to the front height left speaker and the Front Height B signal is fed to the front height right speaker.

For the centre channel, the level is preferably attenuated so it does not become too present in the 5.1.4 setup, but just enough to close the gap between the front left and right speakers. In an exemplified set-up, the signal is attenuated by 10 dB. This level may vary depending on the music/content used.

The phase reverse problem is not necessarily present when upmixing a 2D surround format to 3D. Since the height rears do not generate a small amount of identical information as the lower level front speakers, there may be no need to phase reverse the height layer. However, since the front height left and front height right do generate an identical signal it, is preferred to apply the previously described processing on the front height signal. This results in 2 separate channels for the front height speakers.

In cinematic sound design the designers often use the front left and right speakers to enlarge the width of for example a voice or an important sound. That sound will then be equally present in both the front left and right signal. Since the present method uses MS technology for the height layer, this important sound will remain untouched and not be upmixed to 3D. On the other hand, when cinematic sound designers want to create a feel of space, they will use artificial reverbs to create the feel of space. Reverb is primarily present in the difference signal when processed through an MS matrix. Therefore the reverb will be upmixed into 3D, which will result in an even better feel of space as intended. With these basic principles in mind a variety of 2D to 3D upmixes are possible. For example a 7.1.2 can be created from a 7.1 by upmixing the front left/right speakers.

The invention claimed is:

1. A computer-implemented audio signal processing method for upmixing an input audio stereo signal (S) in a plurality of spatially distributed pseudo surround channels to define a height layer, said computer-implemented audio signal processing method comprising the steps of:

- receiving at least one input audio stereo signal (S);
- performing a pre-processing stage on the input audio stereo signal (S), said pre-processing stage comprising the steps of:
  - performing Mid-Side decoding on the input audio stereo signal (S) to generate at least one Sum (SUM) signal and at least one Difference (DIFF) signal;
  - performing polarity reversal on the at least one Difference (DIFF) signal;
  - performing filtering by means of at least 2 (PF) filtering banks on the at least one polarity-reversed Difference (DIFF) signal;
- reconstructing at least 2 signals from the at least 2 filtering banks (PF) thereby obtaining upmixed output signals (O);
- performing high-pass filtering on at least one upmixed output signal (O) from the obtained upmixed output signals (O);
- performing a level adjustment on the high-pass filtered at least one upmixed output signal (O); and,
- routing the obtained upmixed output signals (O) obtained after high-pass filtering, and level adjustment to audio speaker channels (C) to feed Top Channels, thereby defining a matrix of spatially distributed channels forming the height layer.

2. The computer-implemented audio signal processing method according to claim 1 wherein the filtering banks (PF) are configured to have linear phase response in the frequency domain.

3. The computer-implemented audio signal processing method according to any one of claim 1 or 2, wherein the filtering banks (PF) are configured to operate around filter sub-bands (PSB), each of these filter sub-bands (PSB) having central frequency $F_{SB-C}$, and each of these filter sub-bands (PSB) configured to operate around a range of low-frequency sound waves above a lower cut-off frequency $F_{SB-L}$ and a range of high frequency sound waves lower than an upper cut-off frequency $F_{SB-U}$.

4. The computer-implemented audio signal processing method according to claim 3, wherein each of the filter sub-bands (PSB) is configured to have an amplitude around the sub-band centre frequency $F_{SB-C}$ chosen in the range spanning from −3 dB to −15 dB.

5. The computer-implemented audio signal processing method according to claim 1, wherein each of the filtering banks (PF) is configured to have a width between $\frac{1}{6}^{th}$ of an octave and an octave.

6. The computer-implemented audio signal processing method according to claim 1, wherein the operating frequency range of the filter sub-bands (PSB) is configured to operate within a frequency range spanning from $F_L$ to $F_U$, wherein $F_L$ to $F_U$ is from 350 Hz to 20 KHz.

7. The computer-implemented audio signal processing method according to claim 6, wherein amplitude compensation is performed outside the a frequency support of the filtering banks (PF), and wherein said amplitude compensation is performed in relation to the amplitude level at $F_L$ and $F_U$, and wherein said amplitude compensation entails a resulting amplitude level around $F_L$ and $F_U$ which are chosen within the range spanning from −3 dB to −12 dB.

8. The computer-implemented audio signal processing method according to claim 1, wherein the high-pass filtering is performed on all upmixed output signals (O) using high-pass filters (HPF), and wherein such high-pass filters (HPF) are configured to operate at a central frequency $F_{HFC}$=500 Hz.

9. The computer-implemented audio signal processing method according to claim 8, wherein the high-pass filters are high shelf filters and have linear phase response in the frequency domain.

10. The computer-implemented audio signal processing method according to claim 1, wherein level adjustment is performed on each of the upmixed output audio signals.

11. The computer-implemented audio signal processing method according to claim 1, wherein the computer-implemented audio signal processing method has a processing time in an order of less than 5 milliseconds.

12. The computer-implemented audio signal processing method according to claim 1, wherein time synchronisation is performed at the Mid-Side decoding step, and latency compensation is performed to the input channels not subjected to Mid-Side decoding steps.

13. The computer-implemented audio signal processing method according to claim 1, wherein the computer-implemented audio signal processing method further comprises the steps of:

performing delay adjustment (D-ADJ) on the at least one (SUM) signal;

routing the obtained upmixed output signals (O) to the audio speaker channels (C) to feed at least a Center channel (CE) and a Low Frequency Effect (LFE) channel thereby defining a matrix of spatially distributed channels forming the centre layer; and, performing low-pass filtering (LPF) on the LFE channel.

14. The computer-implemented audio signal processing method according to claim 1, wherein said computer-implemented audio signal processing method is further configured to perform compensation filtering on the obtained upmixed output signals (O).

15. The computer-implemented audio signal processing method according to claim 14, wherein the compensation filtering uses low and/or high shelf filters that have linear phase response in the frequency domain.

* * * * *